(12) United States Patent
Luce

(10) Patent No.: US 6,805,001 B2
(45) Date of Patent: Oct. 19, 2004

(54) PRESSURE DETECTOR ADAPTED TO BE MOUNTED IN A TIRE

(75) Inventor: Dominique Luce, Toulouse (FR)

(73) Assignee: Siemens VDO Automotive, Toulouse (FR)

( * ) Notice: Subject to any disclaimer, the term of this patent is extended or adjusted under 35 U.S.C. 154(b) by 14 days.

(21) Appl. No.: 10/218,526

(22) Filed: Aug. 15, 2002

(65) Prior Publication Data

US 2003/0046994 A1 Mar. 13, 2003

(30) Foreign Application Priority Data

Aug. 16, 2001 (FR) .............................................. 01 10843

(51) Int. Cl.[7] .............................................. B60C 23/02
(52) U.S. Cl. ..................... 73/146.8; 73/146.3
(58) Field of Search ................................ 73/146, 146.2, 73/146.3, 146.4, 146.5, 146.8; 340/438, 442

(56) References Cited

U.S. PATENT DOCUMENTS

| 4,196,414 A | * | 4/1980 | Muller ........................ 340/443 |
| 5,844,131 A | * | 12/1998 | Gabelmann et al. ....... 73/146.8 |
| 6,101,870 A | * | 8/2000 | Kato et al. ................. 73/146.8 |
| 6,672,150 B2 | * | 1/2004 | Delaporte et al. ......... 73/146.2 |

FOREIGN PATENT DOCUMENTS

| DE | 200 15 295 U1 | 4/2001 |
| EP | 0 751 017 B1 | 1/1997 |

* cited by examiner

*Primary Examiner*—Eric S. McCall
(74) *Attorney, Agent, or Firm*—Young & Thompson

(57) ABSTRACT

This pressure detector (8) is adapted to be disposed in a tire mounted on a wheel rim (2) provided with a valve (6) permitting the introduction of air into and the withdrawal of air from the tire. This detector (8) is fixed to the valve (6). It comprises, spaced from the point of securement to the valve, a deformable lip (32) creating a substantially continuous bearing zone against the wheel rim (2).

13 Claims, 2 Drawing Sheets

Figure 1:
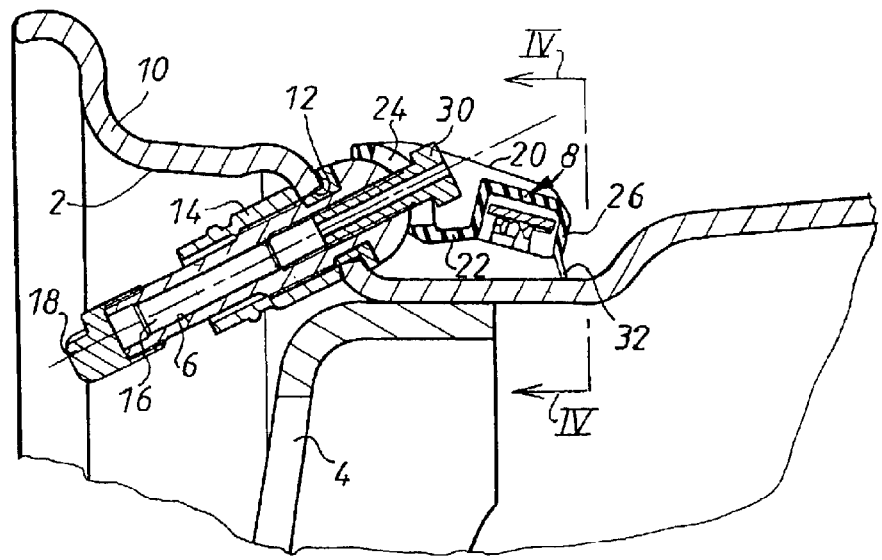

FIG. 4a
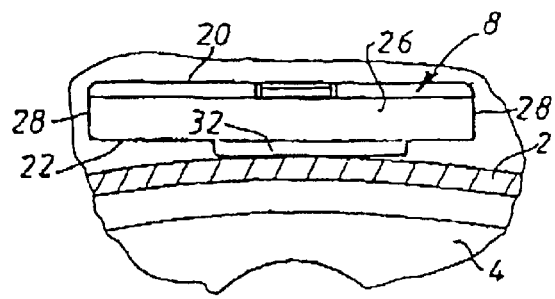
FIG. 4b
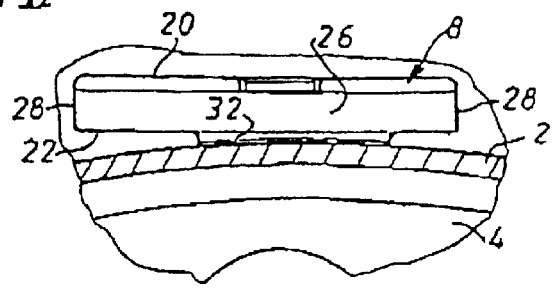
FIG 5a
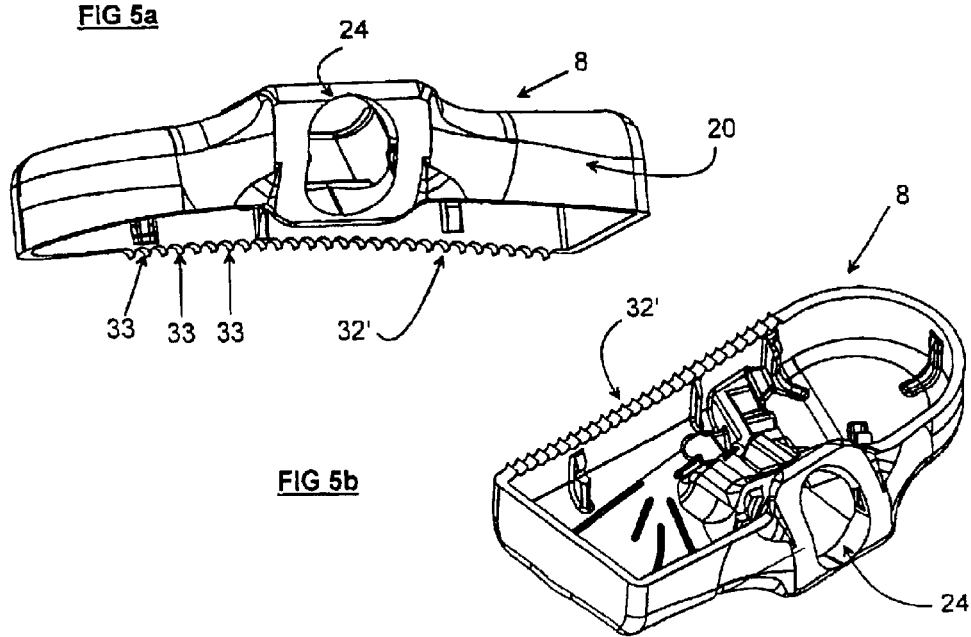
FIG 5b

PRESSURE DETECTOR ADAPTED TO BE MOUNTED IN A TIRE

The present invention relates to a pressure detector adapted to be mounted in a tire.

It is known to provide a tire, of a private car or of heavy weight, with a pressure detector so as to know the pressure prevailing within this tire without having to connect a pressure detector to the corresponding valve. Such detectors are used in surveillance systems for the pressure of tires on certain vehicles. Such a system is known to those skilled in the art.

The tire is mounted on a wheel rim and a valve permits the introduction of air under pressure to inflate the tire or to let air escape from the tire. When such a tire is provided with a pressure detector, this detector is generally fixed on the wheel rim at the valve.

This securement of the detector at one point has several drawbacks. The detector is generally of parallelepipedal shape and does not match the shape of the wheel rim, which is round. It is thus difficult to hold the detector against this wheel rim. The detector thus has a natural tendency to vibrate, even to swing along the periphery of the wheel rim.

The present invention thus has for its object to provide a detector having a better engagement with the wheel rim. Preferably, this detector should be adaptable to wheel rims of different diameters.

To this end, it provides a pressure detector adapted to be placed in a tire mounted on a wheel rim provided with a valve, permitting introduction into and withdrawal of air from the tire, the detector being fixed to the valve.

According to the invention, the detector comprises, spaced from the point of securement to the valve, a deformable lip adapted to form a continuous bearing zone against the wheel rim.

The deformable lip can thus come to bear against the wheel rim. The detector is thus fixed on the one hand to the valve and comprises a bearing region spaced from the point of securement and permitting, thanks to the deformable nature of the lip, best matching of the shape of the wheel rim. The bearing region is for example a bearing line that can take any shape whatsoever (straight, curved, broken, . . . ).

In a preferred embodiment, the detector comprises a support of synthetic material and the lip is formed of one piece with the support. In this embodiment, the lip is for example made by thinning the material, which gives it flexibility.

One embodiment provides that the detector has a substantially parallelepipedal shape and that the deformable lip is provided along one substantially rectilinear edge of the detector. In this embodiment, the lip extends over all or a portion of the length of the edge on which it is located.

Preferably, the deformable lip is disposed opposite the point of securement of the detector to the valve, so as to be spaced the maximum distance from this point of securement.

According to a second embodiment, the deformable lip is constituted by a plurality of teeth adapted to create a substantially continuous bearing zone against the wheel rim, after being flattened.

Figure 2:
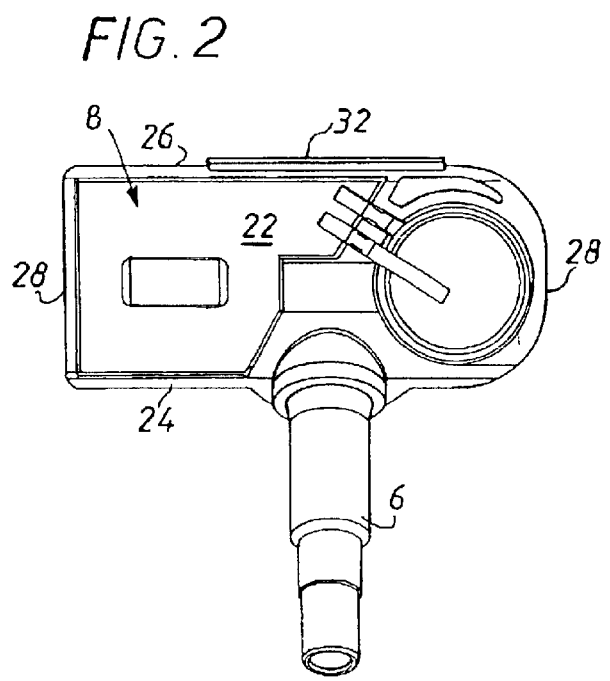
Figure 3:
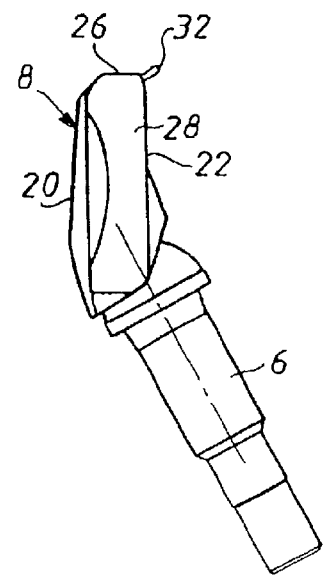

The details and advantages of the present invention will become better apparent from the description which follows, given with reference to the accompanying schematic drawings, in which:

FIG. 1 is a fragmentary cross-sectional view of a detector according to the invention, mounted on a wheel rim, FIG. 2 is a bottom view of the detector of FIG. 1, FIG. 3 is a side view of the same detector, FIG. 4a is a cross-sectional view on the line IV—IV of FIG. 1 in the case of a wheel rim of small diameter, FIG. 4b is a view corresponding to FIG. 4a for a wheel rim of larger diameter, and FIGS. 5a and 5b are schematic perspective views showing a second embodiment of the invention.

FIG. 1 shows in partial cross-section a wheel rim 2 and a wheel flange 4 as well as in cross-section a valve 6 and a pressure detector 8. The wheel rim 2 has a shoulder 10 adapted to receive a tire (not shown).

In a known manner, the wheel rim 2 has a bore 12 adapted to receive the valve 6. This latter is emplaced before the tire and is held by a nut 14.

The valve 6 comprises an internal channel 16 adapted to permit, in a known manner, the introduction of air into the tire, or else the withdrawal of this air. A cap 18 closes the channel 16 at its end located outside the tire.

FIGS. 2 and 3 show the assembly formed by the detector 8 and the valve 6. It will be noted in this figure that the detector has a substantially parallelepipedal shape. This parallelepipedal comprises an upper surface 20, a lower surface 22, a longitudinal external surface 24, a longitudinal internal surface 26 and two lateral surfaces 28.

The upper surface 20 and the lower surface 22 are the largest surfaces of the parallelepipedal. The upper surface is oriented toward the tire whilst the lower surface is oriented toward the wheel rim. In the present, the terms "lower" and "upper" are selected with reference to FIG. 1. It is clear that when the detector 8 is mounted on the valve 6, the relative positions of these surfaces change when the corresponding wheel turns.

The securement of the detector 8 on the valve 6 is ensured by a screw 30. The detector 8 is in contact with the valve 6 at the longitudinal external surface 24. This latter locally matches the shape of the valve. The screw 30 passes through the external longitudinal surface 24 and coacts with a tapping provided at the end of the channel 16 of the valve 6 opening into the tire. During screwing of the screw 30, the detector can swing, thereby ensuring its proper positioning. At the end of screwing, the screw 30 is gripped and ensures the blocking of the detector at the bottom of the wheel rim profile.

At the junction between the lower surface 22 and the longitudinal internal surface 26, the edge of the detector has a lip 32. This lip 32, in the mounted position of the detector, extends toward the wheel rim 2 and comes into contact with this latter. This lip extends over a portion of the length of the internal longitudinal surface 26 and is substantially centered relative to the valve 6. This lip is fairly long, so as to bear against the wheel rim 2 when the detector 8 is fixed by the screw 30 on the valve 6.

The detector 8 is, in a manner known to those skilled in the art, constituted by a support of synthetic material on which are disposed on the one hand the pressure detector properly so called, an emitter permitting transmitting the results of measurement carried out by the pressure detector to a receiver located onboard a corresponding vehicle, various electronic components for managing the detector as well as means for supplying the detector with electrical energy. These various elements will not be described in detail here. The support of the detector of synthetic material is for example obtained by molding. In the embodiment shown in the drawings, the lip 32 is an integral portion of this support and is formed of a single piece with the latter. A thinning of the material of this lip 32 permits giving to it flexibility and resilience. In this manner, the lip 32 can ensure a continuous bearing of the detector 8 against the wheel rim 2 by absorbing at least a portion of the vibrations to which the detector is submitted when the corresponding vehicle moves.

As shown in FIGS. 4a and 4b, the lip 32 is adapted to various diameters of wheel rim. For a wheel rim of small diameter (FIG. 4a), the bearing lip 32 will come into contact with the wheel rim only at the central portion of this lip. For wheel rims of larger diameter (FIG. 4B), the bearing lip comes into contact with the wheel rim 2 over its length. The height of the lip (which is seen in FIG. 1) as well as the length of this lip (which is seen in FIG. 2) are adapted as a function of the distance separating the detector, on the side opposite the securement of the detector to the valve, from the wheel rim 2, as well as the various diameters of wheel rim on which the detector is to be mounted. It will here be noted that it is in general useless to have a lip extending over all the length of the detector. The height and thickness of the lip are adapted as a function of the distance separating the detector from the wheel rim and of the bearing force to be exerted.

In all cases, there is a continuous bearing (and not point-wise) on at least a portion of the length of the lip 32. The bearing zone has, in the case described here, a linear shape.

The detector described above is thus secured by a rigid screw-threaded connection on the one hand to the valve and bears by means of the deformable lip 32 on the side opposite the rigid securement, against the wheel rim 2. There is thus obtained a forcible contact between the lip 32 and the wheel rim 2. The securement of this detector thus permits limiting the vibrations and oscillations transmitted to this detector.

It will also be noted that the detector requires a negligible increase in cost relative to detectors of the prior art. Thus, a simple modification by molding permits providing that the support of the detector is sufficient to obtain the detector according to the invention. The increase in cost of synthetic material can be considered as negligible in this case.

The present invention is not limited to the preferred embodiment described above by way of non-limiting example. It relates to all modifications of embodiment within the scope of a person skilled in the art, within the scope of the following claims.

Thus, for example, although it is preferred, the screw-threaded securement of the detector on the valve can be replaced by another type of securement, for example a snap-on securement.

In the above embodiment, the deformable bearing lip is centered relative to the valve. In the case for example in which the valve is located at one end of the detector, there could for example be provided a lip which extends from only one side of the valve.

The position of the lip on the edge separating the lower surface of the detector from the internal longitudinal surface of the detector can be modified. It can for example be provided that the lip 32 projects from the lower surface 22. In this case, for example, the lip could have a non-rectilinear shape, for example in the form of the arc of a circle, or an ellipse.

FIGS. 5a and 5b show only the detector 8 (without the valve 6) and show a second embodiment of the invention.

The deformable lip 32' according to this embodiment has a plurality of projections 33 (called teeth). There is effected after flattening of this lip against the wheel rim, a substantially continuous bearing of the housing on the wheel rim, by means of a large number of contact points 33.

This embodiment is advantageous because the deformation of the lip is facilitated and better controlled. Thus each of the teeth 33 can be flattened as a function of the exact shape of the wheel rim against which the housing is pressed. The point-wise deformation of each tooth is easier to carry out than the continuous deformation of all the lip, as in the case of the first embodiment. The contact between the wheel rim and the housing remains a substantially continuous contact, even if in this case it is constituted by a plurality of points creating after partial flattening a substantially continuous line.

It is to be noted that the teeth are made of a rigid plastic material. The deformation of the lip is thus obtained by the small cross-section of each of these teeth (and not only by the flexibility of the material which constitutes them), which permits them to flatten more easily against the wheel rim.

What is claimed is:

1. Pressure detector adapted to be disposed in a tire mounted on a wheel rim provided with a valve permitting the introduction and withdrawal of air into and from the tire, the detector being secured to the valve, wherein the detector comprises, spaced from the point of securement to the valve, a deformable lip adapted to form a substantially continuous bearing zone against the wheel rim, wherein the deformable lip is constituted by a plurality of teeth adapted to create a substantially continuous bearing zone against the wheel rim, after flattening.

2. Pressure detector according to claim 1, comprising a support of synthetic material, wherein the lip is formed of one piece with the support.

3. Pressure detector according to claim 2, wherein the lip is made by thinning of material which gives said lip flexibility.

4. Pressure detector according to claim 1, characterized in that the detector has a substantially parallelepipedal shape and in that the deformable lip (32, 32') is provided along the substantially rectilinear edge of the detector.

5. Pressure detector according to claim 1, characterized in that the deformable lip (32, 32') is located opposite the point of securement of the detector (8) to the valve (6).

6. Pressure detector according to claim 1, characterized in that the teeth (33) are made of a rigid plastic material.

7. Pressure detector according to claim 2, characterized in that the detector (8) has a substantially parallelepipedal shape and in that the deformable lip (32, 32') is provided along the substantially rectilinear edge of the detector.

8. Pressure detector according to claim 3, characterized in that the detector (8) has a substantially parallelepipedal shape and in that the deformable lip (32, 32') is provided along the substantially rectilinear edge of the detector.

9. Pressure detector according to claim 2, characterized in that the deformable lip (32, 32') is located opposite the point of securement of the detector (8) to the valve (6).

10. Pressure detector according to claim 3, characterized in that the deformable lip (32, 32') is located opposite the point of securement of the detector (8) to the valve (6).

11. Pressure detector according to claim 4, characterized in that the deformable lip (32, 32') is located opposite the point of securement of the detector (8) to the valve (6).

12. Pressure detector according to claim 7, characterized in that the deformable lip (32, 32') is located opposite the point of securement of the detector (8) to the valve (6).

13. Pressure detector according to claim 8, characterized in that the deformable lip (32, 32') is located opposite the point of securement of the detector (8) to the valve (6).

* * * * *